US010237592B2

(12) United States Patent
Gai et al.

(10) Patent No.: US 10,237,592 B2
(45) Date of Patent: Mar. 19, 2019

(54) METHOD AND APPARATUS FOR VIDEO TRANSMISSION

(71) Applicant: Alcatel Lucent, Boulogne Billancourt (FR)

(72) Inventors: Yongming Gai, Shanghai (CN); Bin Zhao, Shanghai (CN); Yujian Wang, Shanghai (CN); Zhaohui Jiang, Shanghai (CN); Shan Jin, Shanghai (CN); Qingqing Lun, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/541,226

(22) PCT Filed: Dec. 30, 2014

(86) PCT No.: PCT/CN2014/095552
§ 371 (c)(1),
(2) Date: Jun. 30, 2017

(87) PCT Pub. No.: WO2016/106557
PCT Pub. Date: Jul. 7, 2016

(65) Prior Publication Data
US 2018/0007402 A1    Jan. 4, 2018

(51) Int. Cl.
*H04N 7/173* (2011.01)
*H04N 21/239* (2011.01)
(Continued)

(52) U.S. Cl.
CPC ......... *H04N 21/2393* (2013.01); *H04L 29/06* (2013.01); *H04L 67/1097* (2013.01);
(Continued)

(58) Field of Classification Search
CPC .......................... H04N 21/2393; H04N 21/60
See application file for complete search history.

(56) References Cited

U.S. PATENT DOCUMENTS 7,831,989 B1 * 11/2010 Calzone .............. H04L 12/2801
370/428
8,537,835 B2   9/2013 Saniee
(Continued)

FOREIGN PATENT DOCUMENTS

CN    101193294 A    6/2008
CN    101291425 A   10/2008
(Continued)

OTHER PUBLICATIONS

International Search Report for PCT/CN2014/095552 dated Oct. 10, 2015.

*Primary Examiner* — Gigi L Dubasky
(74) *Attorney, Agent, or Firm* — Fay Sharpe LLP

(57) ABSTRACT

An objective of the present invention is to provide a method and apparatus for video transmission, wherein the video is initially stored in one or more other network devices. The method comprises receiving a second request for a video from a user equipment; forwarding the second request to other network device corresponding to the second request; determining a manner of obtaining the video based on a response, received from the other network device, to the second request; and transmitting the video obtained based on the manner of obtaining the video to the user equipment. Compared with the prior art, by uniformly determining a manner of obtaining a video and transmitting the obtained video to the user equipment the present invention, the present invent on lowers deployment difficulty, reduces bandwidth resource demands, and enhances the video sharing degree.

16 Claims, 3 Drawing Sheets

(51) Int. Cl.
  *H04L 29/06* (2006.01)
  *H04N 21/60* (2011.01)
  *H04N 21/2387* (2011.01)
  *H04N 21/472* (2011.01)
  *H04L 29/08* (2006.01)
  *H04N 21/431* (2011.01)

(52) U.S. Cl.
  CPC ......... *H04L 67/2842* (2013.01); *H04N 7/173* (2013.01); *H04N 21/2387* (2013.01); *H04N 21/472* (2013.01); *H04N 21/60* (2013.01); *H04N 21/431* (2013.01)

(56) References Cited

U.S. PATENT DOCUMENTS

| | | | |
|---|---|---|---|
| 8,930,538 B2 | 1/2015 | Fullagar et al. | |
| 2010/0191805 A1* | 7/2010 | Lu | H04L 67/2842 709/203 |
| 2012/0023530 A1 | 1/2012 | Xia | |
| 2012/0259997 A1* | 10/2012 | Liskov | H04L 67/2814 709/238 |
| 2012/0284759 A1 | 11/2012 | Lv et al. | |
| 2013/0290544 A1* | 10/2013 | Kohli | H04L 63/0281 709/226 |
| 2014/0115062 A1* | 4/2014 | Liu | H04L 29/08729 709/204 |
| 2017/0142218 A1* | 5/2017 | Fieau | H04L 67/2842 |

FOREIGN PATENT DOCUMENTS

| | | |
|---|---|---|
| CN | 101668177 A | 3/2010 |
| CN | 101860720 A | 10/2010 |
| CN | 102047244 A | 5/2011 |
| CN | 102067617 A | 5/2011 |
| CN | 102696234 A | 9/2012 |

\* cited by examiner

METHOD AND APPARATUS FOR VIDEO TRANSMISSION

FIELD OF THE INVENTION

The present invention relates to the technical field of communications network, and more specifically to a method and apparatus for video transmission.

BACKGROUND OF THE INVENTION

Currently, a mobile subscriber needs to access a video service provider platform via the network of a mobile operator to retrieve a video program. However, this manner will result in considerable bandwidth consumption between the network of a mobile operator and a video service provider platform. In order to solve this problem, each video service provider will generally deploy an Edge CDN (Edge Content Delivery Network) node in the network of a mobile operator, respectively, which Edge CDN node may be used for buffering a video content that is frequently accessed, such that the Edge CDN node may directly provide the video content to a mobile subscriber without communication with the video service provider platform needed. However, this solution has some problems. For example, each video service provider needs to deploy Edge CDN nodes in the network of a mobile operator respectively, which increases the deployment cost and easily causes a deployment problem; respective Edge CDN nodes only communicate with respective video service providers, there lacks interaction between the respective Edge CDN nodes such that for the same video, it is still needed to be buffered in each Edge CDN nodes, respectively, which causes wastes of storage space. Therefore, during the video transmitting process, it is a problem that needs to be solved regarding how to lower the deployment difficulty, reduce bandwidth resource demands, and increase sharing.

SUMMARY OF THE INVENTION

An objective of the present invention is to provide a method and apparatus for video transmission.

According to one aspect of the present invention, there is provided a method for video transmission, wherein the video is initially stored in one or more other network devices, wherein the method comprises:

receiving a second request for a video from a user equipment;

forwarding the second request to other network device corresponding to the second request;

determining an obtaining manner for the video based on a response to the second request as received from the other network device;

sending the video obtained based on said obtaining manner for the video to the user equipment.

According to another aspect of the present invention, there is provided an apparatus for video transmission, wherein the video is initially stored in one or more other network devices, wherein the apparatus comprises:
a module configured to receive a second request for a video from a user equipment;
a module configured to forward the second request to other network device corresponding to the second request;
a module configured to determine an obtaining manner for the video based on a response to the second request as received from the other network device;
a module configured to send the video obtained based on the obtaining manner for the video to the user equipment.

Compared with the prior art, the present invention determines a uniform retrieving manner of a video and transmits the retrieved video to the user equipment, which lowers the deployment difficulty, reduces bandwidth resource demands, and increases video sharing.

BRIEF DESCRIPTION OF THE ACCOMPANYING DRAWINGS

Other features, objectives, and advantages will become more apparent by reading detailed depictions of non-limiting embodiments with reference to the accompanying drawings.

In the drawings, like reference numerals represent same or corresponding components.

DETAILED DESCRIPTION OF THE PREFERRED EMBODIMENTS

Hereinafter, the present invention will be described in detail with reference to the accompanying drawings.

Figure 1:
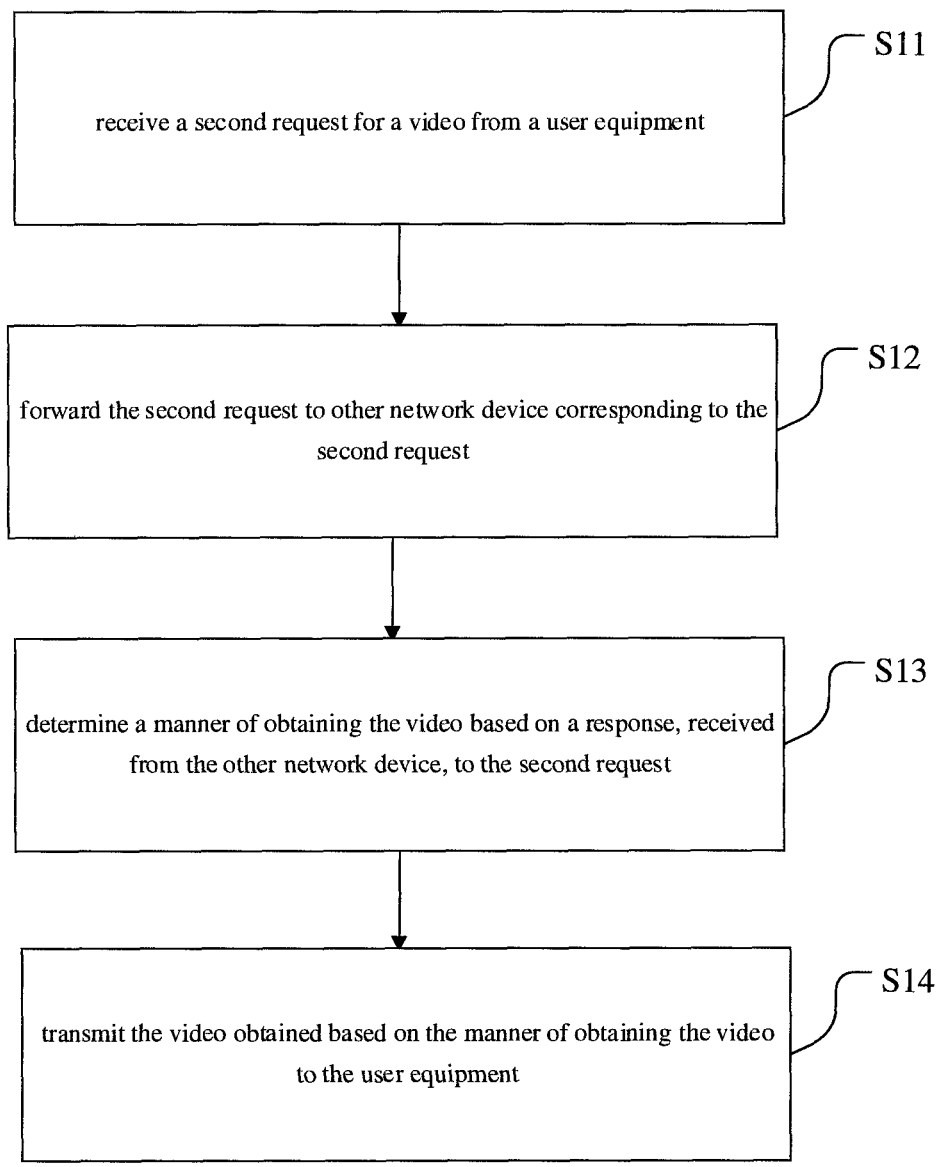
FIG. 1 is a flow diagram illustrating a method for video transmission according to an embodiment in one aspect of the present invention.

FIG. 1 illustrating a flow diagram of a method for video transmission according to one aspect of the present invention.

The method may be implemented on a network device. Here, the network device includes, but not limited to, a computer, a network host, a single network server, or a cloud consisting of a plurality of network server clusters or a plurality of servers. Here, the cloud consists of a large number of computers or network servers based on cloud computing, wherein the cloud computing is a kind of distributive computing, i.e., a virtual supercomputer consisting of a group of loosely coupled computer clusters. The network includes, but not limited to, the Internet, a wide area network, a metropolitan area network, a local area network, a VPN network, and an Ad Hoc network, etc.

Besides, in the context of the present disclosure, a user equipment may be any kind of electronic device that can directly or indirectly communicate with a network device, including, but not limited to: a desktop computer, a portable computer, a mobile phone, a PDA, etc.

In the context of the present disclosure, other network device refers to other network device than the network device implementing the present method, including, but not limited to a computer, a network host, a single network server, or a cloud consisting of a plurality of network server clusters or a plurality of servers. Here, the cloud consists of a large number of computers or network servers based on cloud computing, wherein the cloud computing is a kind of distributive computing, i.e., a virtual supercomputer consisting of a group of loosely coupled computer clusters. The network includes, but not limited to, the Internet, a wide area network, a metropolitan area network, a local area network, a VPN network, and an Ad Hoc network, etc.

It should be noted that a video is initially stored in one or more other network devices.

In an instance of network deployment, a user equipment is a mobile terminal, and the network device implementing the method of the present invention may be located within a mobile carrier network, while the other network device mentioned above may be located within other video service provider network. Those skilled in the art should understand that relevant depictions about the network deployment are only exemplary, not limitative. Various kinds of other network deployment manners are existent without departing from the spirit or scope of the present invention, which are incorporated here by reference.

First, in step S11, a network device receives a second request for a video from a user equipment. Specifically, the user equipment may transmit the second request for the video to the network device via a network or via a specific interface with the network device. For example, the user equipment may transmit the second request for accessing the video in a form of http request to the network device via the network. Correspondingly, the network device receives the second request for the video from the user equipment via the network or via the specific interface with the user equipment. For example, the network device may receive the second request in the form of http request as mentioned above via the network. Those skilled in the art should understand that here, relevant depictions regarding receiving, by the network device, the second request for a video from the user equipment are only exemplary, not limitative. Various kinds of other implementation manners are existent without departing from the spirit or scope of the present invention, which are incorporated here by reference.

In an embodiment, the network device receives the second request for the video from the user equipment, the second request being transmitted based on a response of other network device to a first request by the user equipment for the video of the other network device. Hereinafter, it will be further depicted with reference to FIG. 2.

Next, in step S12, the network device forwards the second request for the video from the user equipment to other network device corresponding to the second request. Here, the other network device corresponding to the second request may be other network device from which the user equipment desires to be capable of obtaining the requested video. For example, the user equipment desires to be capable of obtaining the video from other network device 0D1; then the user equipment may include the address of the other network device 0D1 in the second request and transmits to the network device; then the network device may forward the request to the other network device 0D1 corresponding to the second request according to the address of the other network device 0D1 included in the second request.

In an embodiment, what is received by the network device is a second request for the video from the user equipment, the second request being transmitted based on a response of other network device to the first request by the user equipment for the video on the other network device. Then, the other network device corresponding to the second request here refers to the other network device to which the first request for the video from the user equipment is transmitted. Hereinafter, it will be further described with reference to FIG. 2.

Next, in step S13, the network device determines a manner of obtaining the video based on a response to the second request, received from the other network device. Here, the manner of obtaining the video includes any one of the following: obtaining the video locally from the network device; obtaining the video from the other network device. Specifically, after the network device forwards the second request for the video from the user equipment to the other network device, the other network device will transmit a response to the second request to the network device. The response may include relevant information about the requested video, e.g., title of the video, serial number of the video, etc. The network device obtains the relevant information about the requested video from the response to determine whether the video is locally stored. When the network device determines that the video is locally stored, the network device determines to obtain the video locally; when the network device determines that the video is not stored locally, the network device determines to obtain the video from said other network.

In an embodiment, the network device first determines identification information of the video based on a response to the second request, received from the other network device. In an embodiment, the other network device may include relevant information of the video, e.g., the title of the video and the serial number of the video, in the response. Then, the network device may obtain the relevant information of the video through the response and use the relevant information as identification information of the video. In a preferred embodiment, the response to the second request includes video header information of the video, wherein the video header information includes video content. Then, the network device may obtain the video header information of the video through the response and obtains a video content with a first length from the video header information. Next, the network device performs Hash calculation to the video content with the first length to obtain a Hash value that may uniquely identify the video, and uses the Hash value as the identification information of the video. It should be noted that for the same video, it may have a different video title or video number or other relevant information in a different other network device. Therefore, respective responses of respective other network devices to the second request for the video may include mutually different relevant information. In other words, the relevant information of the video cannot maintain unique among a plurality of other network devices. On the contrary, because video contents of the same video stored in respective other network devices are identical, the Hash value obtained from performing Hash calculation to the video content with the first length is identification information of the video which maintains unique among a plurality of other network devices.

Here, the first length may be preset and adjusted according to actual needs. In a preferred embodiment, the network device may also set a value of the first length according to a video type. For example, the network device may set the first length to be 500 bytes for the video type of MP4 format, while set the first length to be 300 bytes for the video type of FLV format. Those skilled in the art should understand that relevant depictions of the video type and the first length are only exemplary, not limitative. Various kinds of other video types and the values of first length are existent without departing from the spirit or scope of the present invention, which are incorporated here by reference.

Next, the network device determines whether the video is stored locally in the network device based on the identification information. For example, the network device may determine whether the local storage includes a video corresponding to the identification information by querying the local storage. Then, the network device determines the manner of obtaining the video based on the result of determining whether the video is stored locally in the network device. Specifically, when the network device determines that the video is stored locally in the network device, the network device determines to obtain the video from the local; when the network device determines that the video is not stored locally in the network device, the network device determines to obtain the video from the other network device.

In an embodiment, the network device may store the video locally based on the times of the second request by respective user equipments for the video within a first time threshold and based on the identification information. Specifically, when the times of the second request by respective user equipments for the video exceeds a certain specific threshold A within the first time threshold, the network device may store the video locally. Moreover, the network device makes the locally stored video exactly correspond to the identification information, such that the locally stored video may be queried according to the identification information. By locally storing the frequently requested video, the network device may obtain the video from the local and provide it to the user equipment, without a need of further obtaining the video from other network device. It should be noted that as mentioned above, the identification information may uniquely identify the video among a plurality of other network devices. For example, the plurality of other network devices belong to different video service providers, respectively; then when respective user equipments frequently request a video service provider A for the video, the network device may locally store the video. Further, when subsequently a user equipment requests a video service provider B for the video, the network device needn't request the video service provider B for the video; instead, the video may be obtained locally and provided to the user equipment. Therefore, compared with the prior art, the present invention increases share degree and further reduces bandwidth demand while reducing the difficulty of network deployment.

Here, the first time threshold and the specific threshold A mentioned above may be preset and may be dynamically adjusted according to actual needs.

In a further embodiment, the network device deletes the video from the local based on times of the second request by respective user equipments for the video within a second time threshold and based on the identification information. Specifically, when the times of the second request by respective user equipments for the video within the second time threshold is less than a certain specific threshold B, the network device deletes the video corresponding to the identification information from the local. Here, the second time threshold and the specific threshold B mentioned above may be preset and may be dynamically adjusted according to actual needs.

Figure 2:
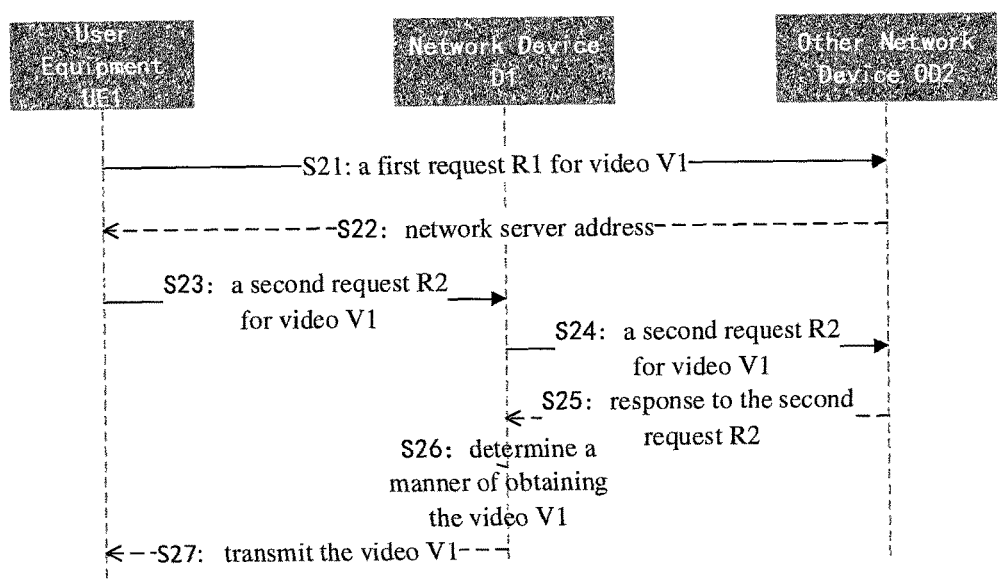
FIG. 2 illustrates an instance of a method for video transmission according to one aspect of the present invention.

FIG. 2 illustrates an instance of a method for video transmission according to one aspect of the present invention. In this example, the network device D1 will receive a second request for a video V1 from the user equipment UE1, the second request being transmitted based on a response of other network device 0D2 to a first request by the user equipment UE1 for the video V1 on the other network device 0D2.

First, in step S21, the user equipment UE1 may transmit a first request for a video V1 on the other network device 0D2 to the network device 0D2 via a network or via a specific interface with the other network device 0D2. The first request for example may be a http request.

In step S22, the other network device 0D2 may transmit a response to the first request to the user equipment UE1 via the network or via the specific interface with the user equipment UE1. The response may include an address that is connected to the network device D1 directly or by way of for example being redirected. For example, the response may include a dynamic URL that may be redirected to the network device D1.

In step S23, the user equipment UE1 transmits a second request for the video V1 to the network device D1 according to the method above based on the address connectable to the network device D1 included in the response.

In step S24, the network device D1 forwards the second request to other network device corresponding to the second request. Here, the other network device corresponding to the second request refers to other network device to which the first request by the user equipment UE1 for the video V1 is transmitted, i.e., other network device 0D2. In this example, the network device D1 forwards the second request to the other network device 0D2 according to the method above.

Next, in step S25, the other network device 0D2 transmits a response to the second request to the network device D1 according to the method above, the response including video header information of the video V1, the video header information including video content of the video V1.

In step S26, the network device D1 obtains the video content of the video with a first length from the video header information included in the response according to the method above based on the response to the second request received from the other network device 0D2, performs Hash calculation to the video content, and determines the obtained Hash value as identification information of the video V1. Next, the network device D1 determines whether the video V1 is stored locally according to the method above based on the identification information. Moreover, the network device D1 determines a manner of obtaining the video V1 based on a result of determining whether the video V1 is stored locally. In other words, when the video V1 is stored locally, it is determined to obtain the video V1 from its local storage; while when the video V1 is not stored locally, it is determined to obtain the video V1 from the other network device 0D2.

In this example, supposing that the network device D1 determines that the video V1 is stored locally, it is determined that the video V1 is obtained locally.

Next, in step S27, the network device D1 transmits the video V1 obtained locally to the user equipment UE1.

Figure 3:
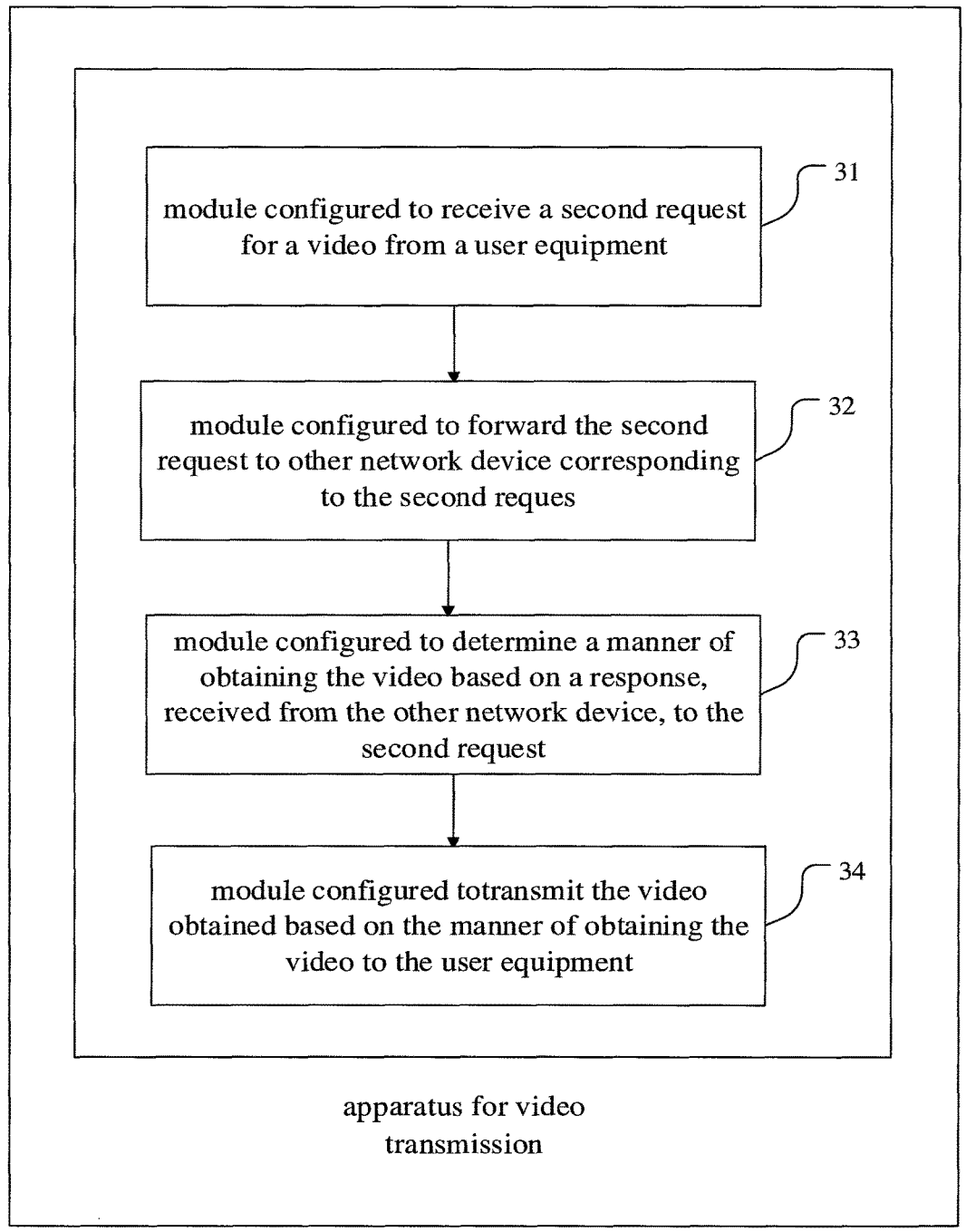
FIG. 3 is a schematic diagram of an apparatus for video transmission according to an embodiment in another aspect of the present invention.

FIG. 3 illustrates a schematic diagram of an apparatus for video transmission according to another aspect of the present invention.

The apparatus may be implemented in a network device. Here, The method may be implemented on a network device. Here, the network device includes, but not limited to, a computer, a network host, a single network server, or a cloud consisting of a plurality of network server clusters or a plurality of servers. Here, the cloud consists of a large number of computers or network servers based on cloud computing, wherein the cloud computing is a kind of distributive computing, i.e., a virtual supercomputer consisting of a group of loosely coupled computer clusters. The network includes, but not limited to, the Internet, a wide area network, a metropolitan area network, a local area network, a VPN network, and an Ad Hoc network, etc.

Besides, in the context of the present disclosure, a user equipment may be any kind of electronic device that can directly or indirectly communicate with a network device, including, but not limited to: a desktop computer, a portable computer, a mobile phone, a PDA, etc.

In the context of the present disclosure, other network device refers to other network device than the network device implementing the present method, including, but not limited to a computer, a network host, a single network server, or a cloud consisting of a plurality of network server clusters or a plurality of servers. Here, the cloud consists of a large number of computers or network servers based on cloud computing, wherein the cloud computing is a kind of distributive computing, i.e., a virtual supercomputer consisting of a group of loosely coupled computer clusters. The network includes, but not limited to, the Internet, a wide area network, a metropolitan area network, a local area network, a VPN network, and an Ad Hoc network, etc.

It should be noted that a video is initially stored in one or more other network devices.

In an instance of network deployment, a user equipment is a mobile terminal, and the network device implementing the method of the present invention may be located within a mobile carrier network, while the other network device mentioned above may be located within other video service provider network. Those skilled in the art should understand that relevant depictions about the network deployment are only exemplary, not limitative. Various kinds of other network deployment manners are existent without departing from the spirit or scope of the present invention, which are incorporated here by reference.

As illustrated in FIG. 3, the apparatus for video transmission according to another aspect of the present invention comprises a module 31 configured to receive a second request for a video from a user equipment (hereinafter referred to as a request receiving module 31); a module 32 configured to forward the second request to other network device corresponding to the second request (hereinafter referred to a request forwarding module 32); a module 33 configured to determine a manner of obtaining the video based on a response, received from the other network device, to the second request (hereinafter referred to as a first determining module 33); and a module 34 configured to transmit the obtained video to the user equipment based on the manner of obtaining the video (hereinafter referred to as a transmitting module 34).

First, the request receiving module 31 receives a second request for a video from a user equipment. Specifically, the user equipment may transmit the second request for the video to the network device via a network or via a specific interface with the network device. For example, the user equipment may transmit the second request for accessing the video in a form of http request to the network device via the network. Correspondingly, the network device receives the second request for the video from the user equipment via the network or via the specific interface with the user equipment. For example, the request receiving module 31 may receive the second request in the form of http request as mentioned above via the network. Those skilled in the art should understand that here, relevant depictions regarding receiving, by the request receiving module 31, the second request for a video from the user equipment are only exemplary, not limitative. Various kinds of other implementation manners are existent without departing from the spirit or scope of the present invention, which are incorporated here by reference.

In an embodiment, the request receiving module 31 receives the second request for the video from the user equipment, the second request being transmitted based on a response of other network device to a first request by the user equipment for the video of the other network device. Hereinafter, it will be further depicted with reference to FIG. 2.

Next, the request forwarding module 32 forwards the second request for the video from the user equipment to other network device corresponding to the second request. Here, the other network device corresponding to the second request may be other network device from which the user equipment desires to be capable of obtaining the requested video. For example, the user equipment desires to be capable of obtaining the video from other network device 0D1; then the user equipment may include the address of the other network device 0D1 in the second request and transmits to the network device; then the request forwarding module 32 may forward the request to the other network device 0D1 corresponding to the second request according to the address of the other network device 0D1 included in the second request.

In an embodiment, what is received by the request receiving module 31 is a second request for the video from the user equipment, the second request being transmitted based on a response of other network device to the first request by the user equipment for the video on the other network device. Then, the other network device corresponding to the second request here refers to the other network device to which the first request for the video from the user equipment is transmitted. Hereinafter, it will be further described with reference to FIG. 2.

Next, the first determining module 33 determines a manner of obtaining the video based on a response to the second request, received from the other network device. Here, the manner of obtaining the video includes any one of the following: obtaining the video locally from the network device; obtaining the video from the other network device. Specifically, after the request forwarding module 32 forwards the second request for the video from the user equipment to the other network device, the other network device will transmit a response to the second request to the network device. The response may include relevant information about the requested video, e.g., title of the video, serial number of the video, etc. The first determining module 33 obtains the relevant information about the requested video from the response to determine whether the video is locally stored. When the first determining module 33 determines that the video is locally stored, the first determining module 33 determines to obtain the video locally; when the first determining module 33 determines that the video is not stored locally, the first determining module determines to obtain the video from said other network.

In an embodiment, a module comprised in the first determining module 33 and configured to determine identification information of the video based on the response to the second request received from the other network device, hereinafter shortly referred to as an identification determining module 331 (not shown), first determines identification information of the video based on a response to the second request, received from the other network device. In an embodiment, the other network device may include relevant information of the video, e.g., the title of the video and the serial number of the video, in the response. Then, the identification determining module 331 may obtain the relevant information of the video through the response and use the relevant information as identification information of the video. In a preferred embodiment, the response to the second request includes video header information of the video, wherein the video header information includes video content. Then, the identification determining module 331 may obtain the video header information of the video through the response and obtain a video content with a first length from the video header information. Next, the identification determining module 331 performs Hash calculation to the video content with the first length to obtain a Hash value that may uniquely identify the video, and uses the Hash value as the identification information of the video. It should be noted that for the same video, it may have a different video title or video number or other relevant information in a different other network device. Therefore, respective responses of respective other network devices to the second request for the video may include mutually different relevant information. In other words, the relevant information of the video cannot maintain unique among a plurality of other network devices. On the contrary, because video contents of the same video stored in respective other network devices are identical, the Hash value obtained from performing Hash calculation to the video content with the first length is identification information of the video which maintains unique among a plurality of other network devices.

Here, the first length may be preset and adjusted according to actual needs. In a preferred embodiment, the apparatus for video transmission further comprises a module configured to set a value of the first length according to a video type (hereinafter referred to a first length setting module 35 (not shown); the first length setting module 35 may also set the value of the first length according to a video type. For example, the first length setting module 35 may set the first length to be 500 bytes for the video type of MP4 format, while set the first length to be 300 bytes for the video type of FLV format. Those skilled in the art should understand that relevant depictions of the video type and the first length are only exemplary, not limitative. Various kinds of other video types and the values of first length are existent without departing from the spirit or scope of the present invention, which are incorporated here by reference.

Next, a module comprised in the first determining module 33 and configured to determine whether the video is stored locally (hereinafter referred to as the second determining module 332 (not shown)) determines whether the video is stored locally in the network device based on the identification information. For example, the second determining module 332 may determine whether the local storage includes a video corresponding to the identification information by querying the local storage. Then, a module comprised in the first determining module 33 and configured to determine the manner of obtaining the video based on the result of determining whether the video is stored locally in the network device (hereinafter referred to as a third determining module 333 (not shown)) determines the manner of obtaining the video based on a result of determining whether the video is stored locally in the network device. Specifically, when the second determining module 332 determines that the video is stored locally in the network device, the third determining module 333 determines to obtain the video from the local; when the second determining module 332 determines that the video is not stored locally in the network device, the third determining module 333 determines to obtain the video from the other network device.

In an embodiment, the apparatus for video transmission may further comprise a module configured to store the video locally based on the times of the second request by respective user equipments for the video within a first time threshold and based on the identification information (hereinafter referred to as a video storing module 36 (not shown)); the video storing module 36 may store the video locally based on the times of the second request by respective user equipments for the video within a first time threshold and based on the identification information. Specifically, when the times of the second request by respective user equipments for the video exceeds a certain specific threshold A within the first time threshold, the video storing module 36 may store the video locally. Moreover, the video storing module 36 makes the locally stored video exactly correspond to the identification information, such that the locally stored video may be queried according to the identification information. By locally storing the frequently requested video, the network device may obtain the video from the local and provide it to the user equipment, without a need of further obtaining the video from other network device. It should be noted that as mentioned above, the identification information may uniquely identify the video among a plurality of other network devices. For example, the plurality of other network devices belong to different video service providers, respectively; then when respective user equipments frequently request a video service provider A for the video, the video storing module 36 may locally store the video. Further, when subsequently a user equipment requests a video service provider B for the video, the apparatus for video transmission needn't request the video service provider B for the video; instead, the video may be obtained locally and provided to the user equipment. Therefore, compared with the prior art, the present invention increases share degree and further reduces bandwidth demand while reducing the difficulty of network deployment.

Here, the first time threshold and the specific threshold A mentioned above may be preset and may be dynamically adjusted according to actual needs.

In a further embodiment, the apparatus for video transmission further comprises a module configured to delete the video from the local based on times of the second request by respective user equipments for the video within a second time threshold and based on the identification information (hereinafter referred to as a video deleting module 37 (not shown)); the video deleting module 37 deletes the video from the local based on times of the second request by respective user equipments for the video within a second time threshold and based on the identification information. Specifically, when the times of the second request by respective user equipments for the video within the second time threshold is less than a certain specific threshold B, the video deleting module 37 deletes the video corresponding to the identification information from the local. Here, the second time threshold and the specific threshold B mentioned above may be preset and may be dynamically adjusted according to actual needs.

FIG. 2 illustrates an instance of an apparatus for video transmission according to another aspect of the present invention. In this example, the network device D1 will receive a second request for a video V1 from the user equipment UE1, the second request being transmitted based on a response of other network device 0D2 to a first request by the user equipment UE1 for the video V1 on the other network device 0D2.

First, in step S21, the user equipment UE1 may transmit a first request for a video V1 on the other network device 0D2 to the network device 0D2 via a network or via a specific interface with the other network device 0D2. The first request for example may be a http request.

In step S22, the other network device 0D2 may transmit a response to the first request to the user equipment UE1 via the network or via the specific interface with the user equipment UE1. The response may include an address that is connected to the network device D1 directly or by way of for example being redirected. For example, the response may include a dynamic URL that may be redirected to the network device D1.

In step S23, the user equipment UE1 transmits a second request for the video V1 to the network device D1 according to the method above based on the address connectable to the network device D1 included in the response.

In step S24, the network device D1 forwards the second request to other network device corresponding to the second request. Here, the other network device corresponding to the second request refers to other network device to which the first request by the user equipment UE1 for the video V1 is transmitted, i.e., other network device 0D2. In this example, the request forwarding module 32 in the network device D1 forwards the second request to the other network device 0D2 according to the method above.

Next, in step S25, the other network device 0D2 transmits a response to the second request to the network device D1 according to the method above, the response including video header information of the video V1, the video header information including video content of the video V1.

In step S26, the identification determining module 331 in the network device D1 obtains the video content of the video with a first length from the video header information included in the response according to the method above based on the response to the second request received from the other network device 0D2, performs Hash calculation to the video content, and determines the obtained Hash value as identification information of the video V1. Next, the second determining module 332 in the network device D1 determines whether the video V1 is stored locally according to the method above based on the identification information. Moreover, the third determining module 333 in the network device D1 determines a manner of obtaining the video V1 based on a result of determining whether the video V1 is stored locally. In other words, when the video V1 is stored locally, the third determining module determines to obtain the video V1 from its local storage; while when the video V1 is not stored locally, the third determining module 333 determines to obtain the video V1 from the other network device 0D2.

In this example, supposing that the second determining module 332 in the network device D1 determines that the video V1 is stored locally, the third determining module 333 determines that the video V1 is obtained locally.

Next, in step S27, the transmitting module 34 in the network device D1 transmits the video V1 obtained locally to the user equipment UE1.

It should be noted that the present disclosure may be implemented in software and/or a combination of software and hardware. For example, each module of the present disclosure may be implemented by an application-specific integrated circuit (ASIC) or any other similar hardware device. In one embodiment, the software program of the present disclosure may be executed through a processor to implement the steps or functions as mentioned above. Likewise, the software program (including relevant data structure) of the present disclosure may be stored in a computer readable recording medium, e.g., RAM memory, magnetic or optic driver or soft floppy or similar devices. Additionally, some steps or functions of the present disclosure may be implemented by hardware, for example, a circuit cooperating with the processor so as to implement various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method for video transmission in a network device, wherein the video is initially stored in one or more other network devices, wherein the method comprises:
   receiving a second request for a video from a user equipment;
   forwarding the second request to an other network device corresponding to the second request;
   determining an obtaining manner for the video based on a response to the second request as received from the other network device;
   sending the video obtained based on said obtaining manner for the video to the user equipment,
   wherein the user equipment sends a first request for the video to the other network device.

2. The method according to claim 1, wherein the receiving a second request for a video from a user equipment comprises:
   receiving a second request for the video from a user equipment, said second request being transmitted based on a response of the other network device to a first request by the user equipment for the video on said other network device.

3. The method according to claim 1, wherein the determining an obtaining manner for the video based on a response to the second request as received from the other network device comprises:
   determining identification information of the video based on a response to the second request as received from the other network device;
   determining whether the video is stored locally based on the identification information;
   determining an obtaining manner for the video based on the result of determining whether the video is stored locally.

4. The method according to claim 3, wherein the determining identification information of the video based on a response to the second request as received from the other network device comprises:
- obtaining video content for determining identification information of the video from video header information included in the response, wherein the video content has a first length;
- determining a Hash value obtained from calculation based on the video content as the identification information of the video.

5. The method according to claim 4, further comprising: setting a value of the first length based on a video type.

6. The method according to claim 3, further comprising: storing the video locally based on times of second request for the video by respective user equipments within a first time threshold and based on the identification information.

7. The method according to claim 3, further comprising: removing the video from local storage based on times of second request for the video by respective user equipments within a second time threshold and based on the identification information.

8. The method according to claim 1, wherein the obtaining manner for the video comprises any one of the following:
- obtaining the video from said network device locally;
- obtaining the video from said other network device.

9. An apparatus for video transmission in a network device, wherein the video is initially stored in one or more other network devices, wherein the apparatus comprises:
- at least one processor; and
- at least one memory including computer program code, the at least one memory and the computer program code configured to, with the at least one processor, cause the apparatus to at least:
- receive a second request for a video from a user equipment;
- forward the second request to an other network device corresponding to the second request;
- determine an obtaining manner for the video based on a response to the second request as received from the other network device; and
- send the video obtained based on the obtaining manner for the video to the user equipment,
- wherein the user equipment sends a first request for the video to the other network device.

10. The apparatus according to claim 9, wherein the at least one memory and the computer program code are further configured to, with the at least one processor, cause the apparatus to:
- receive a second request for the video from a user equipment, said second request being transmitted based on a response of the other network device to a first request by the user equipment for the video on said other network device.

11. The apparatus according to claim 9, wherein the at least one memory and the computer program code are further configured to, with the at least one processor, cause the apparatus to:
- determine identification information of the video based on a response to the second request as received from the other network device;
- determine whether the video is stored locally based on the identification information; and
- determine an obtaining manner for the video based on a result of determining whether the video is stored locally.

12. The apparatus according to claim 11, wherein the at least one memory and the computer program code are further configured to, with the at least one processor, cause the apparatus to:
- obtain video content for determining identification information of the video from video header information included in the response, wherein the video content has a first length; and
- determine a Hash value obtained from calculation based on the video content as the identification information of the video.

13. The apparatus according to claim 12, wherein the at least one memory and the computer program code are further configured to, with the at least one processor, cause the apparatus to:
- set a value of the first length based on a video type.

14. The apparatus according to claim 11, wherein the at least one memory and the computer program code are further configured to, with the at least one processor, cause the apparatus to:
- store the video locally based on times of second request for the video by respective user equipments within a first time threshold and based on the identification information.

15. The apparatus according to claim 11, wherein the at least one memory and the computer program code are further configured to, with the at least one processor, cause the apparatus to:
- remove the video locally based on times of second request for the video by respective user equipments within a second time threshold and based on the identification information.

16. The apparatus according to claim 9, wherein the obtaining manner for the video comprises any one of the following:
- obtaining the video from said network device locally;
- obtaining the video from other network device.

* * * * *